United States Patent [19]
Emmons

[11] Patent Number: 5,509,479
[45] Date of Patent: Apr. 23, 1996

[54] SUBTERRANEAN REMEDIATION PUMP AND PROCESS FOR USE

[76] Inventor: Phillips C. Emmons, 1314 12th St., Huntington, W. Va. 25701

[21] Appl. No.: 302,310

[22] Filed: Sep. 8, 1994

[51] Int. Cl.⁶ .................................................. E21B 43/38
[52] U.S. Cl. ........................... 166/265; 166/370; 166/53; 166/68; 166/105
[58] Field of Search ............................ 166/53, 68, 105, 166/265, 370; 210/104

[56] References Cited

U.S. PATENT DOCUMENTS

| | | | |
|---|---|---|---|
| 4,273,650 | 6/1981 | Solomon | 210/104 |
| 4,469,170 | 9/1984 | Farmer, Jr. | 166/53 |
| 4,497,370 | 2/1985 | Breslin | 166/372 |
| 4,527,633 | 7/1985 | McLaughlin et al. | 166/370 |
| 4,546,830 | 10/1985 | McLaughlin et al. | 166/370 |
| 4,625,801 | 12/1986 | McLaughlin et al. | 166/267 |
| 4,663,037 | 5/1987 | Breslin | 210/170 |
| 4,678,040 | 7/1987 | McLaughlin et al. | 166/370 |
| 4,746,423 | 5/1988 | Mayer | 210/104 |
| 4,761,225 | 8/1988 | Breslin | 210/104 |
| 4,826,406 | 5/1989 | Wells | 166/372 X |
| 4,934,458 | 6/1990 | Warburton et al. | 166/370 |
| 4,998,585 | 3/1991 | Newcomer et al. | 166/105 |
| 5,099,920 | 3/1992 | Warburton et al. | 166/53 X |
| 5,147,184 | 9/1992 | Newcomer et al. | 166/105 X |
| 5,207,897 | 5/1993 | Baird et al. | 210/109 |
| 5,224,837 | 7/1993 | Lamphere et al. | 210/104 X |
| 5,261,791 | 11/1993 | Goguen | 417/2 |
| 5,286,141 | 2/1994 | Vigneri | 405/128 |
| 5,341,877 | 8/1994 | Abdul et al. | 166/53 X |
| 5,358,038 | 10/1994 | Edwards et al. | 166/105 |

*Primary Examiner*—Roger J. Schoeppel
*Attorney, Agent, or Firm*—Richard C. Willson, Jr.

[57] ABSTRACT

A subterranean pump of compact design can be inserted into boreholes commonly used for exploratory drill holes to observe subterranean contaminants. The pump operates at the water-oil interface so as to draw off contaminating oil while avoiding the unnecessary pumping of water which would deplete the capacity of the pump. Preferably, the subterranean pump is a jet pump (ejector or educator) which operates on fluids pumped back down-hole by an above ground auxiliary pump. The down-hole pump is maintained at the water-oil interface by floats or other sensors which detect the water-oil interface and operate an electrical hoist or other lifting device to raise and lower the pump in the borehole.

10 Claims, 3 Drawing Sheets

5,509,479

SUBTERRANEAN REMEDIATION PUMP AND PROCESS FOR USE

BACKGROUND OF INVENTION

I. Field of the Invention

The present invention relates to the field of subterranean pumps, particularly pumps for decanting light oils and other subterranean liquids which are floating below ground on the water table. Generally classified in U.S. Class 166, subclass 372.

II. Description of the Prior Art

Prior patents for removal of hydrocarbons floating on ground water include: U.S. Pat. No. 4,761,225 to Breslin; U.S. Pat. No. 4,273,650 to Solomon; U.S. Pat. No. 4,469,170 to Farmer; U.S. Pat. No. 4,497,370 to Breslin; U.S. Pat. No. 4,527,633 to McLaughlin; U.S. Pat. No. 4,546,830 to McLaughlin; U.S. Pat. No. 5,207,897 to Baird; U.S. Pat. No. 4,625,801 to McLaughlin; U.S. Pat. No. 4,663,037 to Breslin; U.S. Pat. No. 4,678,040 to McLaughlin; U.S. Pat. No. 4,746,423 to Moyer; U.S. Pat. No. 4,934,458 to Warburton; U.S. Pat. No. 4,998,585 to Newcomer; U.S. Pat. No. 5,261,791 to Goguen.

Virtually all such devices float on the water so that they are subject to sticking in the well bore.

SUMMARY OF THE INVENTION

I. General Statement of the Invention

According to the invention, a subterranean pump of compact design is supplied, preferably capable of insertion into the 2" bores commonly used for exploratory drill holes in observation of subterranean contaminants prior to remediation. These test borings are used to determine the level and estimate quantities of contaminant, e.g. light oils from service stations, floating on the natural water table. The ability of the pump to be inserted into the test drillings without requiring additional expensive drilling is a substantial advantage of the invention. The pump operates at the oil-water interface so as to draw off oil while avoiding the unnecessary pumping of water which would deplete the capacity of the pump.

This decanting at the water-oil interface is accomplished by the invention's providing of hoist float switch and automatic level controller which adjusts the level at which the pump is suspended in the drill hole so that the pump draws from the contaminant (e.g. oil) phase at a point near (but not below) the top of the water table. Additionally, an oleophillic membrane can be provided on the inlet of the pump assembly to further minimize the pumping of entrained water. The reduction of pumping of water by adjustment of the elevation of the pump assembly and further by the preferred oleophillic membrane, avoids the reduction of the pump capacity by unnecessary pumping of water, and concentrates the full capacity of the pump on the pumping of the contaminating oil or other contaminant floating on the water. This feature permits the small size of the pump which in turn permits it to be used in exploratory drill holes without additional cost for drilling.

Hoist

The preferred hoist is a conventional electrical hoist similar to those used in garages for lifting engine blocks, etc.

Tubing

Any hydrocarbon-resistant tubing can be utilized but Tygon-brand tubing is especially preferred.

Electrical

Because of the flammability of the hydrocarbons being pumped, an explosion proof and preferably intrinsically-safe electrical system are utilized. These can be of conventional design. An exemplary electrical system for the pump and hoist is shown in FIG. 3.

Light Oils and other subterranean contaminants which are floating above ground on the water table are removed by a pump having a sensor which senses the oil/water interface and positions the pump inlet at a point just above that interface by sending signals to a hoist which raises and lowers the pump in the wellbore.

The sensor is preferably operated by floats and intakes liquids preferably through an oleophillic membrane-covered inlet port. Above ground auxiliary pumping equipment is preferably provided to operate a down-hole jet pump which recovers about two gallons of fluids for each gallon forced through it by the auxiliary pump.

The various components can be fabricated by those skilled in the art or can be purchased commercially. Principal components (shown in FIG. 1) are as follows:

Pump

The pump 44 is a 1–25 gallon per hour (gph), more preferably 2–15 gph, most preferably 5–10 gph jet pump ejector using a venturi and nozzle combination. A suitable pump is available from Environmental Recovery Systems, 1314 12th Street, Huntington, W. Va. 25701. The preferred pump is made of aluminum, polyvinyl chloride, and reinforced fiberglass, but other materials may of course, be substituted.

Above Ground Reservoir Pump

The pump reservoir 18 in FIG. 2, can include a relatively high pressure pump for pumping hydrocarbons or other hydraulic fluid. The most preferred pumping media is the recovered oil itself which can be recycled down-hole to recover an approximately equal quantity of additional contaminating oil so that the volume up is approximately twice the volume down. The above ground pump should be a submergible type capable of providing a flow of about 5–50 gph, most preferably about 10–30 gallons per hour (roughly 95 liters per hour) at a pressure of about 50 psig (about 3 atmospheres) at the above ground pump outlet. This pressure will increase somewhat at the inlet to the below ground jet pump 22 because of the elevation head.

Hoist Float Switch

Hoist float switch consists of conventional reed switches plus a float manufactured of PVC with a magnet located on either side to actuate the reed switches shown as 48 and 50 in FIG. 1.

Pump Float Switch

Pump float switch 42 preferably comprises a similar PVC float with a magnet on the upper end which actuates a similar reed switch 53.

Oleophillic Membranes

Oleophillic membranes preferably comprise 100 mesh, but can be 100 mesh to 200 mesh, preferably stainless steel coated with an oleophillic coating, most preferably polytetrafluorethylene available as "TEFLON", a trademark of the DuPont Corporation. The membrane is available commercially coated with either Teflon or polyethylene, or other oleophillic plastic coatings.

II. Utility of the Invention

The present invention is useful for a wide variety of remediation and recovery operations, but is particularly adapted to the recovery of hydrocarbons which have leaked from leaking underground storage tanks (LUST) or above ground tanks which have gradually leaked with the hydrocarbons or other contaminants leaching through the surface of the earth until they come to rest floating on the natural water table. The invention can be adapted for use with light oils, e.g. heating oil, diesel fuels, naphtha, gasoline, jet fuel (JP4 and others).

While the invention is particularly preferred for oil levels of several inches, it is capable of withdrawing oil from levels from a film of oil floating on the water table to a thickness of 20 feet or more

BRIEF DESCRIPTION OF THE DRAWINGS

FIG. 2 shows the invention powered by 110 volt AC power supply, batteries, solar power, or other source of power can be substituted.

DESCRIPTION OF THE PREFERRED EMBODIMENTS

Figure 2:
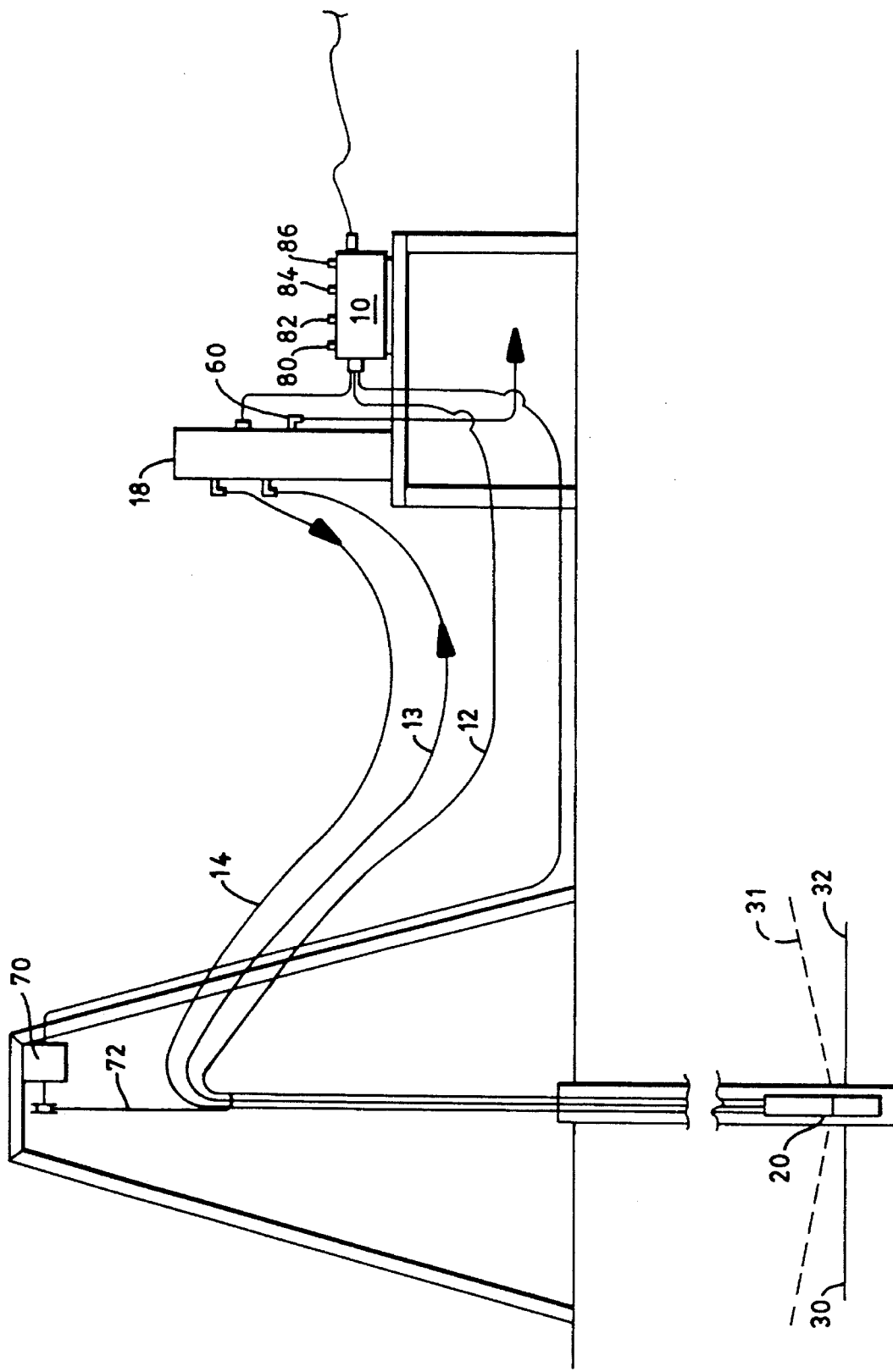
FIG. 2 is a schematic diagram of the pump of FIG. 1 in place below the ground showing the subterranean ground water level and the hoist cable which adjusts the elevation of the pump to follow the ground water-oil interface, and further showing the preferably explosion proof, intrinsically safe electrical system used above ground to power the pump.

Referring to FIG. 2, a subterranean ground water level has become contaminated with a level of approximately 10".

EXAMPLE 1

(Invention)

Figure 1:
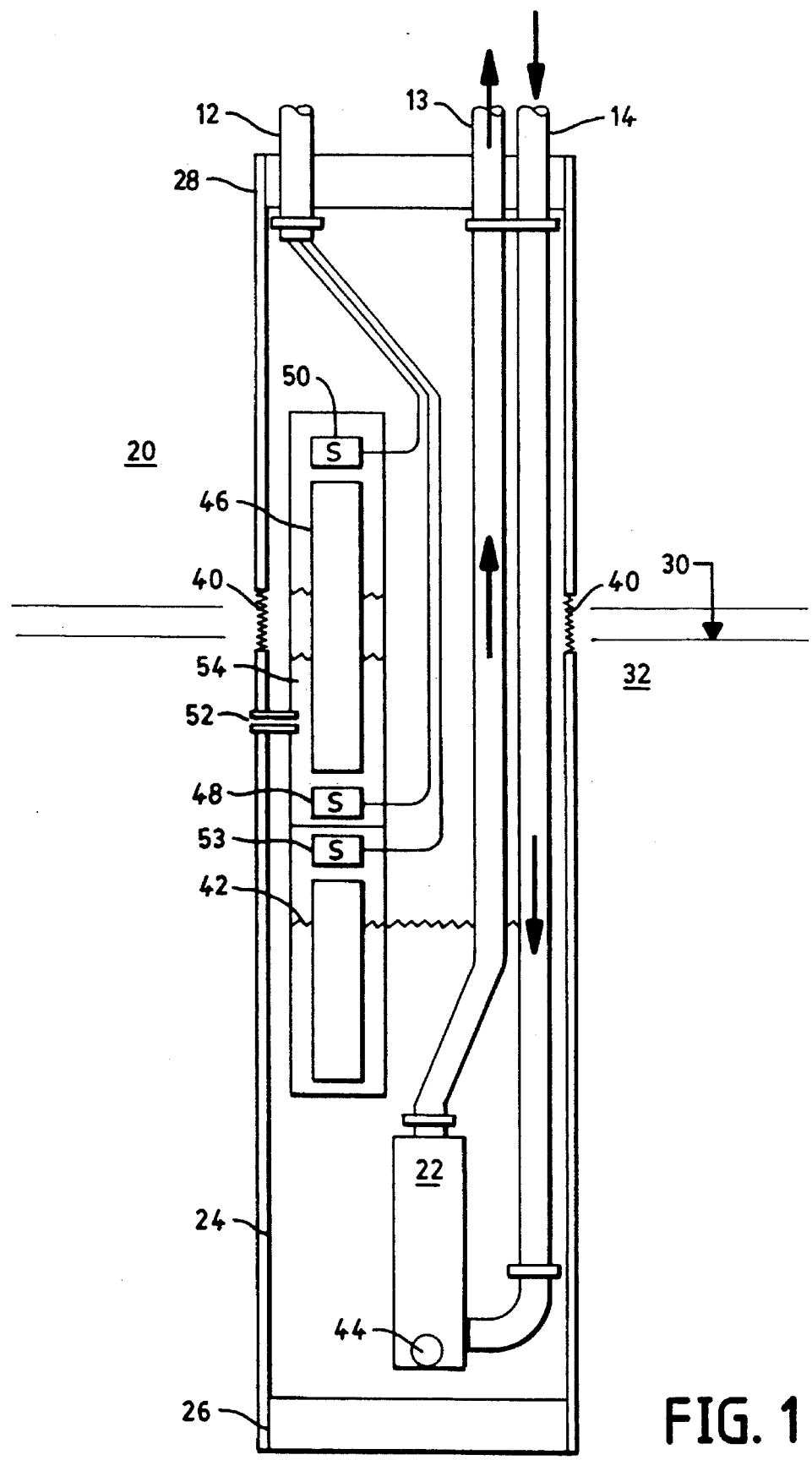
FIG. 1 is a schematic diagram of a typical pump according to the invention showing the oleophillic membranes placed just at the oil-water interface and feeding the jet pump with the hoist float which raises or lowers the pump to follow movement of the oil or water levels.
Figure 3:
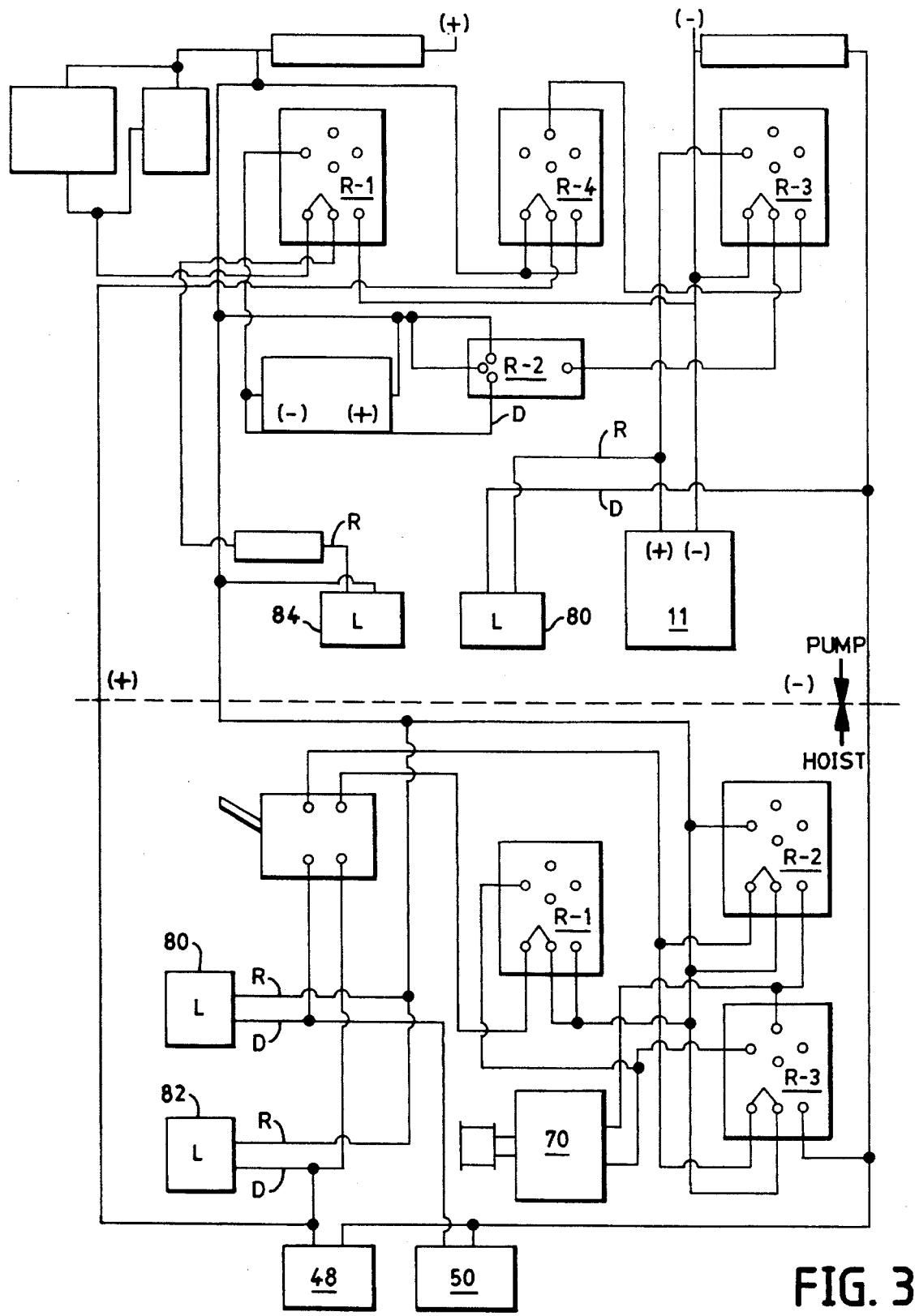
FIG. 3 is a typical electrical diagram for the pump system of FIGS. 1 and 2 showing the controls, the hoist motor, various fuses, etc., all commercially obtainable components.

Referring to FIG. 2, the 110 volt power supply feeds an intrinsically safe explosion proof 110 volt AC 12 volt DC converter which can also contain the electrical controls shown in FIG. 3 for both the hoist and the pump. Controller/ DC power supply 10 is connected to cable 12 which feeds the float control for the down-hole pump 20, shown in more detail in FIG. 1, which in turn is connected to hoses 13 and 14 which lead to and from pump reservoir 18 and which supply jet pump 22 shown in FIG. 1. The pump housing 24 is a 1.5 inch (38 millimeter) cylinder preferably of polyvinyl chloride (PVC) or fiberglass or carbon fiber re-enforced polyester plugged at both ends with plugs 26 and 28. Light oil from the light oil 30 floating on the water table 32 penetrates the oleophillic membrane 40 which is exposed at a number of points spaced around the parameter of housing 24, but the oleophillic membrane does not admit water or anything else which will not wet the membrane. In this case, the membrane is 100 mesh stainless steel coated with "TEFLON" brand PFTE (polytetrafluoroethylene), but polyethylene and other oleophillic materials may be substituted. The incoming oil drains by gravity to the bottom of container 24 until the oil forms a level 42 sufficiently high to raise pump float switch 53 which actuates the pump in the reservoir 18 (shown in FIG. 2) which forces light oil or other hydraulic fluid through hose 14 to actuate jet pump 22 causing oil to enter through a check valve inlet 44 and to exit the jet pump 22 through hose 13 through which is returns to pump reservoir 18. Overflowing the outlet 60 of pump reservoir 18 and moving to a container, e.g. a tank truck, lift tank, lease tank, or other container for holding the oil for recovery or disposal.

Hoist float 46 consists of a float with two limit switches (reed switches 48 and 50). In operation water from the water table 32 enters the hoist float chamber 52 which is hermetically sealed from the remainder of the interior of container 24, and lowers the hoist float to form a water level 54 around the hoist float 46. When the water level 54 drops, e.g. due to dropping of the water table 32, hoist float 46 actuates reed switch 48 which sends a signal through the controller 10 to the electric hoist 70 which lowers hoses and cable 12, 13 and 14, in turn lowering container 24 so that the whole pump assembly 20 is lowered in the borehole until it reaches the new oil-water interface at which point hoist float 46 no longer actuates switch 48, and the hoist operation is suspended so that the elevation of the assembly 24 remains at a point where membranes 40 engage the oil just above the water-oil interface.

Conversely, when water table 32 rises (e.g. due to rain or the like), float 46 actuates reed switch 50 which in turn sends a signal to controller 10 which activates hoist 70 in the opposite direction to raise container 24 until the membranes 40 again engage the oil 30 just above the oil-water interface.

Pumping continues until virtually all of the contaminating oil layer is removed surrounding the borehole, even a film being possible to be separated by the combination of the oleophillic membrane and the jet pump.

It should be noted that the assembly need not be limited to 30 foot depths because the jet pump is capable of raising it to any necessary level in order to pump the oil from the subterranean interface.

In removing the oil, particularly from dense formation, a cone of depression of oil will be formed as illustrated schematically by dotted line 31 shown in FIG. 2. This is because the pump can remove more oil than can seep through the geologic formation immediately surrounding the borehole. The hoist float can sense such cones and can operate to adjust the elevation to follow the interface when it is artificially depressed due to the cone of depression in the oil.

Once removal has been accomplished from one of the test holes which has discovered hydrocarbons, the same operation can readily be repeated by dropping the pump assembly 20 into another test borehole. It is an important feature of the invention that it is not necessary to drill larger holes, e.g. the 4– 6 inch hole commonly required by subterranean pumps, but that the invention can pump from the 2-inch test boreholes themselves which were used to detect the subterranean hydrocarbon contaminant in the first place.

The electrical diagram for the apparatus used in this Example is shown in FIG. 3 which shows the pump 11 which is a component of pump reservoir 18, and showing lights which visually show the status of the hoist and the system as components of controller/power supply 10.

In a experimental test, the pump functions for 4 months substantially without maintenance and pumped a total of between 2000 and 4000 gallons of contaminating oil from the oil-liquid interface in a borehole located at a hydrocarbon fuel transfer terminal. The contaminating oil is approximately the viscosity and API gravity of heating oil.

EXAMPLE 2

(Comparative)

When an apparatus similar to pump 20 is constructed except that the hoist float switch is deleted and the container 20 is sized so as to float in water, the device intended to float on the water-oil interface and to function substantially as shown in the above Example, but without the need for the hoist.

It is found that the container 20 tends to jam in the borehole and must be freed periodically in order to follow the oil-water interface. Similar difficulty is encountered when the assembly 20 is suspended from a float which contains an inlet intended to float at the water-oil interface, and to suspend the pump itself a distance below. Neither design functions sufficiently satisfactorily to become commercial.

Modifications

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein. For example, the hoist cable 72 can be connected directly to the pump housing 24 rather than using hoses 13 and 14 and cable 12 for the lifting.

Reference to documents made in the specification is intended to result in such patents or literature being expressly incorporated herein by reference including any patents or other literature references cited within such documents.

What is claimed is:

1. In a process for the removal of liquid hydrocarbons floating in a hydrocarbon layer to form an interface with a lower water layer below ground, by pumping from a borehole extending through said hydrocarbon layer, the improvement comprising in combination:
    a. providing sensing means for determining the interface between the hydrocarbon layer and the water layer in said borehole, said sensing means sending signals indicative of whether it is located above or below the hydrocarbon layer/water interface for transmitting;
    b. providing lifting means for moving said sensing means up or down within said borehole until said sensing means is at said interface;
    c. pumping from a point within said borehole above said interface by pumping means suspended from lifting means whereby said pumping means is maintained in communication with said hydrocarbon layer by said lifting means varying the elevation of said pumping means within said borehole in response to signals received from said sensing means indicative of the elevation of said interface;
    d. providing oleophillic membrane means on the inlet of said pumping means to reduce pumping of water.

2. A process according to claim 1 wherein said sensing means receive signals from sensing means operating in response to a float means.

3. A process according to claim 1 wherein said hoist means is operated in response to switches which are in turn are operated by float means.

4. A process according to claim 1 wherein above the ground pumping means recycle fluids pumped from within said borehole down-hole to recover additional contaminating oil.

5. An apparatus for removal of hydrocarbons from a borehole extending through a subterranean layer of said hydrocarbons which is floating on subterranean groundwater, comprising in combination:
    a. sensing means for detecting the interface between said oil layer and said groundwater and sending signals to;
    b. lifting means acting in response to said signals to raise and lower;
    c. first pump means which withdraws oil from a point within said oil layer above said the interface between said oil layer and said water; and
    d. second pump means located above ground which recycles fluids pumped from said borehole back downhole to actuated ejector means located down-hole to pump additional quantities of subterranean fluids to the surface
    whereby said first pump means is suspended from said lifting means and said first pump means is raised or lowered by said lifting means in response to signals from said sensing means until said pump means is in communication with said oil layer.

6. A process according to claim 5 wherein said lifting means comprises an electric hoist.

7. A process according to claim 5 wherein said sensing means comprises electrical switches operating in response to movement of float means.

8. An apparatus according to claim 5 wherein said sensing means comprises float actuated switch means in communication with said oil layer.

9. An apparatus according to claim 5 wherein said sensing means comprises float actuated switch means in communication with said groundwater.

10. An apparatus according to claim 9 wherein said sensing means comprises float actuated switch means in communication with said oil layer.

* * * * *